UNITED STATES PATENT OFFICE.

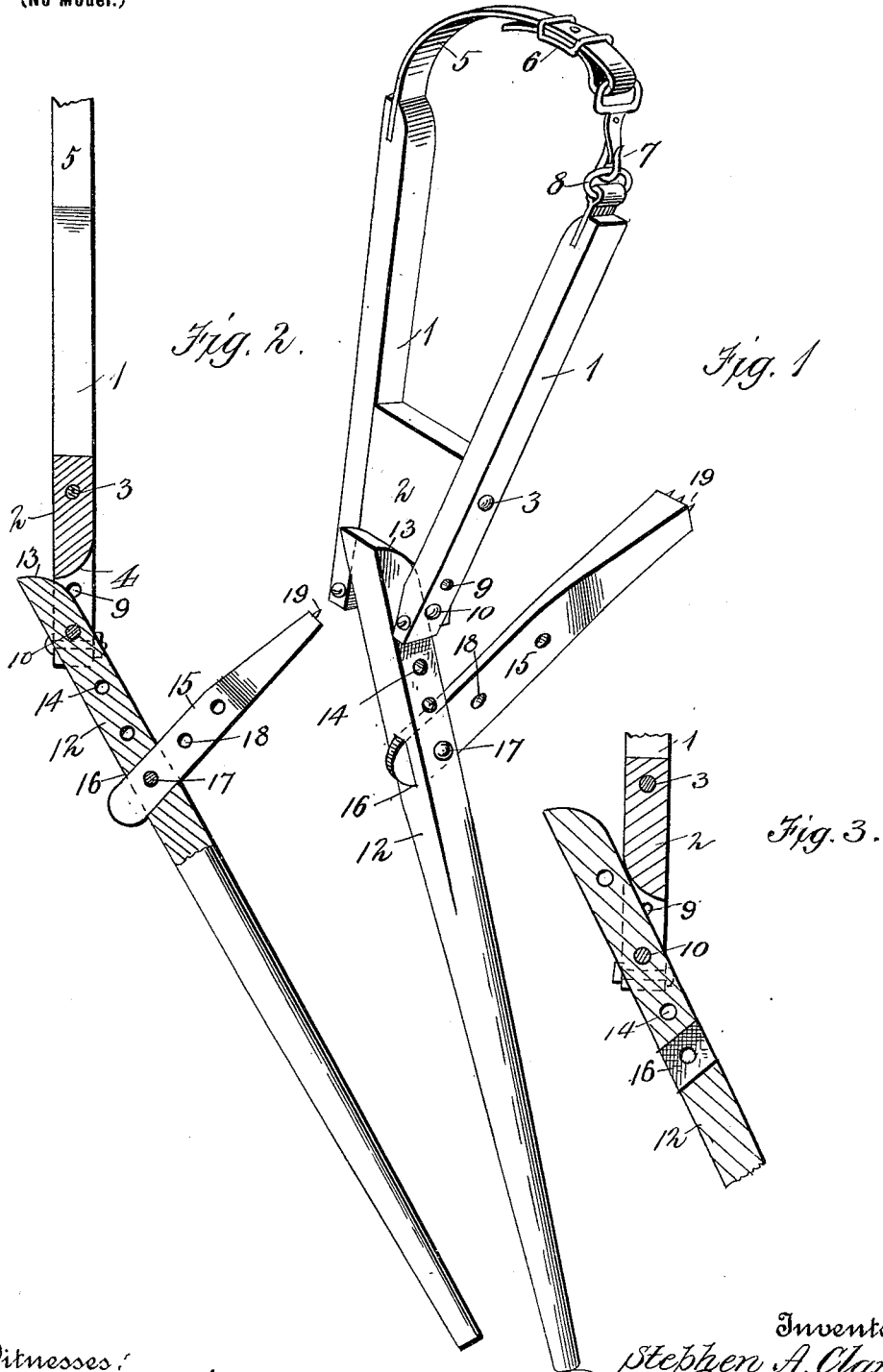

STEPHEN A. CLARK, OF AMOY, OHIO.

ANIMAL-POKE.

SPECIFICATION forming part of Letters Patent No. 641,937, dated January 23, 1900.

Application filed September 8, 1899. Serial No. 729,820. (No model.)

*To all whom it may concern:*

Be it known that I, STEPHEN A. CLARK, a citizen of the United States, residing at Amoy, in the county of Richland and State of Ohio, have invented new and useful Improvements in Animal-Pokes, of which the following is a specification.

My invention relates to animal-pokes for preventing horses and other stock from jumping; and its object is to provide an improved construction of the same which can be adjusted so as to allow it to be used for horses or other animals, which will effectually perform the object for which it is intended, which will not be liable to become broken by the animal's lying down, and which will generally possess superior advantages with respect to efficiency in use.

The invention consists in the novel construction and combination of parts hereinafter fully described and claimed.

In the accompanying drawings, Figure 1 is a perspective view of an animal-poke constructed in accordance with my invention. Fig. 2 is a longitudinal section of the same. Fig. 3 is a detail sectional view showing the device used as a cow-poke.

In the said drawings the reference-numeral 1 designates two inclined arms connected together near the lower ends by a block 2 and bolt 3. The lower end of this block is rounded, as seen at 4. Connected with the upper end of one of these arms is a strap 5, provided with a buckle 6 and a snap-hook 7. This snap-hook is adapted to engage with an eye or ring 8, connected with the other arm. Near the lower ends said arms are formed with a series of holes 9 for the passage of a bolt 10, by which a preventer-bar 12 can be adjustably connected with said arms. The object of making this bar adjustable is to allow it to be used in connection with stock of different sizes. The upper end of this bar is rounded, as seen at 13, and is formed with a series of holes 14.

The numeral 15 designates a small bar, the front end of which passes through a hole or opening 16 in the bar 12 and is held in place by a bolt 17. This small bar is adjustable, being provided with a series of holes 18, so that it can be made to project more or less from the bar 12. At the rear end this small bar is provided with a number of short pins 19.

The operation is as follows when used with a horse: The arms 1 are connected with the neck of the animal by means of the strap which extends around the upper portion of the neck, so that the preventer-bar 12 will extend down in front of the animal. In this position it will not interfere with the animal's feeding or grazing, being pivotally connected with the said arms. In case, however, the animal should attempt to jump, the pins of the short bar will come in contact with the breast of the animal, and thus act as a preventive.

When the device is used on a cow to prevent the animal from injuring a fence with its horns, the short preventer-bar is removed and the long bar is removed and reversed, so that it will project forwardly in front of the animal, so that when the latter attempts to raise or remove the rails of a fence with its horns it will act as a preventive by coming in contact with the ground.

From the above it will be seen that the device will be very durable and efficient in use; that it can be adjusted to fit any-sized neck of horse or other animal, and can also be adjusted so as to be used with moderate or severe jumpers. It can also be readily taken off and be put on, and there will be no liability of its being broken in case the animal should lie down and roll.

Having thus fully described my invention, what I claim is—

In an animal-poke, the combination with the arms having a series of holes near the lower ends, the block, the bolt passing therethrough, the strap and means for connecting the same to the upper ends of said arms, of the adjustable and reversible preventer-bar having a series of holes near the upper end, the bolt connecting it to said arms, and the adjustable and removable short bar provided with pins at the rear end and the bolt for connecting it with the preventer-bar, substantially as described.

In testimony whereof I have hereunto set my hand in presence of two subscribing witnesses.

STEPHEN A. CLARK.

Witnesses:
WM. H. CLARK,
SAMUEL H. KUHN.